A. L. LUCAS.
BABY CARRIAGE.
APPLICATION FILED APR. 20, 1918.

1,303,930.

Patented May 20, 1919.
3 SHEETS—SHEET 1.

Inventor
August L. Lucas

By Henry E. Rockwell
Attorney

A. L. LUCAS.
BABY CARRIAGE.
APPLICATION FILED APR. 20, 1918.

1,303,930.

Patented May 20, 1919.
3 SHEETS—SHEET 2.

Inventor
August L. Lucas
By Henry E. Rockwell
Attorney

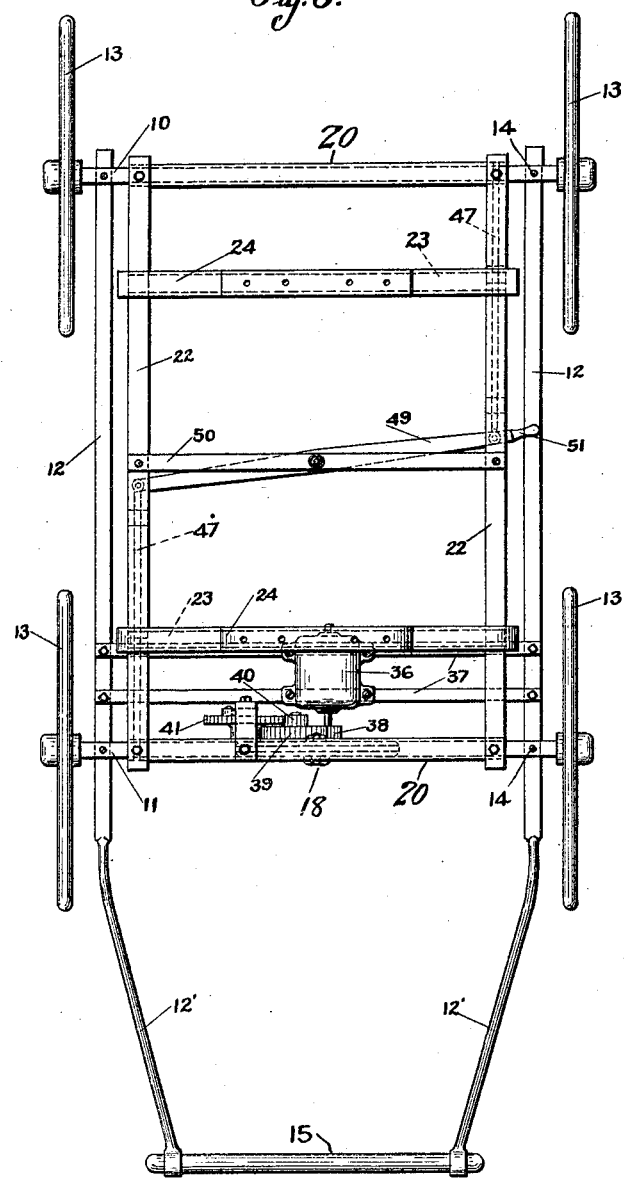

UNITED STATES PATENT OFFICE.

AUGUST L. LUCAS, OF NEW HAVEN, CONNECTICUT.

BABY-CARRIAGE.

1,303,930.     Specification of Letters Patent.     Patented May 20, 1919.

Application filed April 20, 1918. Serial No. 229,751.

*To all whom it may concern:*

Be it known that I, AUGUST L. LUCAS, a citizen of the United States, residing in the city and county of New Haven and State of Connecticut, have invented certain new and useful Improvements in Baby-Carriages, of which the following is a full, clear, and exact description.

This invention relates to a baby carriage provided with mechanism to increase the comfort of the child which occupies the same and with means for reducing and making less arduous the duties of the person attending the child while it is in this carriage.

One object of my invention is to provide means for pivotally supporting the body of a baby carriage upon its supporting frame, in order that the body may be rocked in a substantially vertical plane upon the supporting frame.

Another object is to provide a baby carriage with power operated means mounted upon the carriage for rocking the carriage body relatively to its supporting frame, in order that a child may be entertained or lulled to sleep in this manner, thereby relieving the child's attendant from this duty.

Another object is to provide a swivel wheel for mounting a carriage body upon its supporting frame, in order that the carriage body may be swung in a substantially horizontal plane relatively to the supporting frame.

To these and other ends, the invention consists in the novel features and combinations of parts to be hereinafter described and claimed.

In the accompanying drawings:

Fig. 3 is a plan view of the running gear of my improved baby carriage, the carriage body being removed;

Fig. 5 is an enlarged sectional view taken on line 5—5 of Fig. 1, looking in the direction of the arrows.

Figure 1:
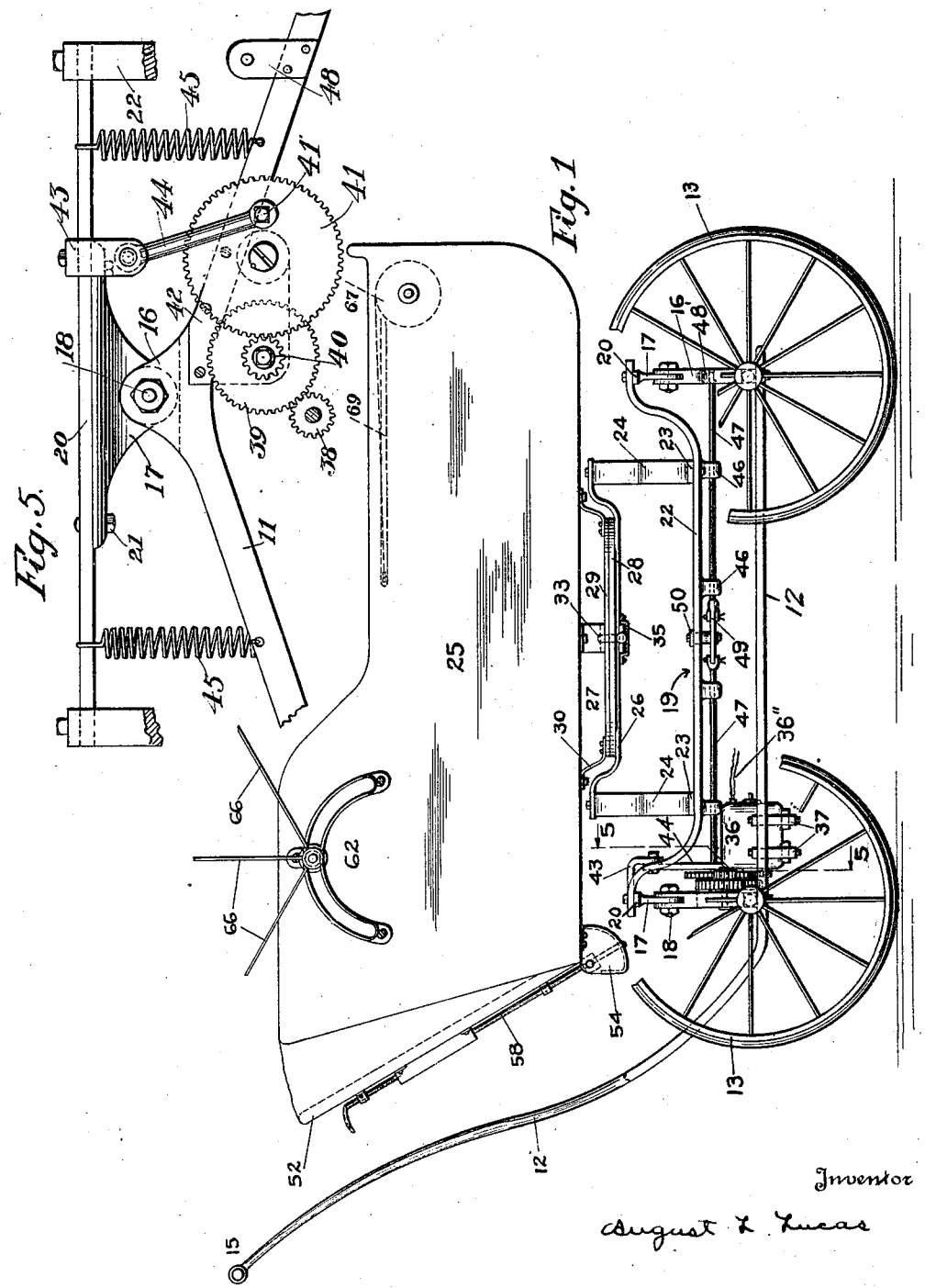
Figure 1 is a side view of my improved baby carriage, the top for the same being shown partly broken away.

In the drawings, I have disclosed my baby carriage as provided with a supporting frame mounted upon wheels, consisting of a front axle 10, a rear axle 11, longitudinally extending braces 12, which rigidly retain the axles 10 and 11 in their spaced position, and wheels 13 mounted upon the opposite ends of the front and rear axles. The braces 12 may be rigidly secured to the front and rear axles by bolts such as 14 or by any other preferred form of securing means. The rear ends of these braces preferably extend rearwardly and upwardly as at 12' to form a support for the usual type of baby carriage handle such as 15.

Figure 2:
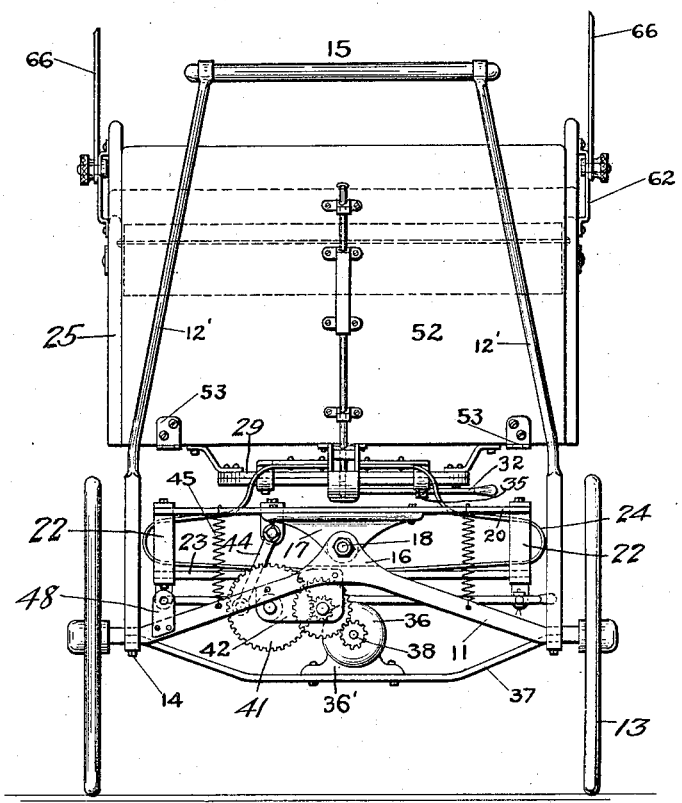
Fig. 2 is a rear end view of the device shown in Fig. 1.
Figure 4:
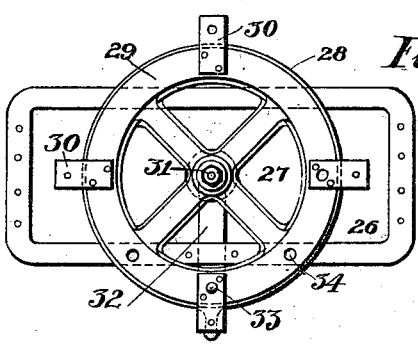
Fig. 4 is a plan view of a swivel frame for mounting the carriage body upon the running gear.

The intermediate portion of the axles 10 and 11 is preferably bent upwardly, as shown in Fig. 2, and upon the upper face of each of these axles at the longitudinal center of the same is mounted a bracket 16 having spaced parallel faces, as shown in Fig. 1, between which faces is pivotally mounted a bracket such as 17. The bracket 17 is pivotally secured between the adjacent faces of the bracket 16 by a pivot bolt such as 18. The brackets 17, which are pivotally mounted upon both the front and rear axles, are provided to pivotally support a substantially rectangular frame 19 upon the wheeled supporting frame just described. The frame 19 preferably consists of straight metal bars 20 bolted to the upper face of the brackets 17 by bolts such as 21. The opposite ends of the front and rear bars 20 are connected by long strips 22, which strips are preferably bent downwardly intermediate their ends, as shown in Fig. 1. The ends of the bars 20 and strips 22 are rigidly secured together in any desired manner to produce a substantially rigid rectangular frame, as shown in Fig. 3. Bolted upon the strips 22 at some distance from the ends thereof and substantially parallel to the bars 20 are a pair of metal bars such as 23, upon which bars are mounted the resilient springs 24 which support the baby carriage body hereinafter described. It will be apparent that if desired the baby carriage body, which is designated in its entirety by the numeral 25, may be mounted directly upon the upper face of the resilient springs 24, but I find it desirable to provide means for pivotally mounting the carriage body 25 relatively to its running gear, in order that the carriage may be swung in a substantially horizontal plane about its pivotal mounting. This particular mounting is very desirable at times, in order that the carriage may be swung about its horizontal pivot through a desired angle, in order for example that the child in the carriage may watch the person pushing the carriage or to prevent the sun from shining in the child's eyes. The pivotal mounting which I provide for the carriage body 25 consists of a supporting frame 26 rather similar in configuration but smaller than the frame 19 above described. The opposite ends of this rectangular frame 26 are rigidly secured to the upper face of the forward and rear springs 24, and between the opposite ends of the rectangular frame 26 upon a downwardly bent intermediate portion is mounted a swivel wheel 27. This swivel wheel preferably consists of a flat ring-like member 28 which is rigidly secured to the frame 26, and a second ring-like member 29 which is concentric with and rotatably mounted upon the member 28. The second ring-like member 29 is provided with a plurality of brackets such as 30, which brackets are adapted to be bolted to the floor of the carriage body 25. Each of the members 28 and 29 is preferably provided with a central web-like structure, by means of which the members 28 and 29 may be bolted together by a bolt 31, which passes through the central structure of these two members. The construction of this swivel wheel is preferably similar to the construction of the fifth wheel of wagons, which are well known and in common use. In order to provide means for locking the members 28 and 29 normally against movement relatively to each other, so that the carriage body 25 will not swing relatively to its running gear except when this is desired, I provide a locking means for the ring-like members 28 and 29 consisting preferably of a flexible metal strip 32 which is secured to the under face of the ring member 28 by means of the swivel bolt 31 above mentioned and upon the upper face of which strip is secured a pin 33. This pin is positioned to extend through a drill hole formed in the ring member 28 and to extend into any one of a number of drill holes such as 34 in the upper ring 29. The resiliency of the strip 32 is preferably sufficient to retain the pin 33 in the drill hole formed in the ring 28 and with its upper end extending into one of the holes 34 formed in the ring 29, so that this pin will prevent the upper ring from rotating relatively to the lower ring except when the strip 32 is depressed sufficiently to disengage its pin 33 from the ring member 29. It will thus be seen that this simple locking means prevents the upper ring 29 from being moved accidentally relatively to the lower ring 28, and thereby prevents the carriage body 25, which is mounted upon the upper ring, from rotating in a horizontal plane relatively to the running gear; and that when it is desired to swing the body 25 relatively to its running gear, all that is necessary is to depress the flexible strip 32 sufficiently to withdraw the pin 33 from one of the drill holes 34, whereupon the carriage body 25 may be freely swung upon its swivel wheel 27. In order to prevent the pin 33 from being entirely withdrawn from the drill hole formed in the ring member 28, I find it desirable to provide a U-shaped bracket such as 35, mounted upon the under face of the ring 28 and positioned over the strip 32.

From the structure so far described, it will be apparent that I have provided means for mounting a baby carriage body upon its wheeled supporting frame, so that the body may be rocked in a vertical plane relatively to the supporting frame of the baby carriage, in a manner somewhat similar to the well known rocking movement of a baby's crib, and, in addition to this, I have provided a swivel wheel for mounting the baby carriage upon the running gear of the carriage, in order that the body may be swung in a horizontal plane relatively to the running gear. It will thus be seen that the carriage body may be rocked about an axis extending longitudinally of the same, or, if desired, the carriage body may be swung upon its swivel wheel to an angle of 90° to that shown in Fig. 1, whereupon the carriage body may be rocked about an axis extending transversely of the same.

In order to provide mechanical means for rocking the body of the baby carriage relatively to its frame, I have provided the baby carriage herein disclosed with a small electric motor 36, provided with a supporting base 36', which may conveniently be mounted upon a pair of parallel bars such as 37 extending from one of the braces 12 to the other by securing the base of this motor to these bars. The current for operating the motor 36 may be supplied to the same by current supply wires such as 36". The armature shaft of the motor 36 is provided with a small gear 38, which operates a plurality of reducing gears such as 39, 40 and 41. These reducing gears are preferably mounted upon a plate 42, which plate is rigidly secured to the rear axle 11. The gear 41 has a pin 41' mounted upon its outer face to one side of the axis about which this gear rotates, as shown in Figs. 2 and 5. In order that the rotating motion imparted to the gears just referred to may be used to cause the rectangular frame 19 and the carriage body which is supported by the same to rock about its pivotal mounting 18, a bracket 43 is rigidly secured to the member 20 to one side of the pivotal mounting 18 and this bracket 43 is connected to the eccentric pin 41' mounted upon one face of the gear 41 by a connecting rod or pitman 44. The power means just described for rocking the frame 19 by means of a plurality of gears and the connecting rod 44 may not impart as smooth a rocking movement to the frame 19 as desired, as a slight jerk would probably occur when the connecting rod reached its lowermost position and again when it reached its uppermost position; that is, a slight jerk might occur at each end of its stroke, but this difficulty may be easily overcome by providing coil springs such as 45 having one end secured to each side of the carriage axle 11 and the opposite end of each spring being connected to the member 20, so that these springs tend to resist the rocking of the frame 19 about its pivotal mounting and to support the same in a substantially horizontal position. The front axle of the carriage is preferably provided with similar springs 45.

When it is no longer desirable to use the carriage as a crib in which the child may be rocked, it is necessary to provide means for positively locking the frame 19 so that it will not be permitted to rock relatively to its supporting frame. For this purpose, I provide a plurality of brackets such as 46 mounted upon the underneath side of each of the longitudinally extending bars 22, and in these brackets are slidably mounted relatively long bolts such as 47. One bolt is positioned to have its outer end moved into engagement with a socket formed in the bracket 48 which is rigidly secured to the rear axle 11, and the other bolt 47 is adapted to have its outer end moved into engagement with a socket formed in a similar bracket 48' positioned upon the front axle of the carriage. These two sliding bolts are operated simultaneously by a lever 49, which lever is carried upon the frame 19 and is pivotally mounted upon a brace 50, which extends from one side of the frame 19 to the other, as shown in Fig. 3. The inner ends of the bolts 47 are pivotally secured to the opposite ends of the lever 49, so that when it is desired to move the outer end of the bolts 47 into engagement with the sockets just referred to, so that the frame 19 will be locked against rocking movement relatively to its wheeled supporting frame, all that is necessary is to grasp the handle 51 formed upon one end of the lever 49 and move the same so as to protract the bolts 47 into the sockets formed in the brackets 48 and 48'. It will be apparent from the above description of the bolts 47 and means for operating the same, when read in connection with the disclosure in Fig. 3, that movement of the lever 49 simultaneously moves the bolts 47 into or out of locking position.

The baby carriage body, illustrated in the drawings, is preferably provided with a hinged back 52 having hinges 53 and a sliding bolt 58, mounted upon the back and constructed to coöperate with a bracket 54 upon the carriage body to support the back in the desired position of adjustment. The carriage body is also preferably provided with a curved bracket 62, upon which the carriage top 66 is pivotally mounted, and if desired, may be adjusted bodily upon this bracket. In the front part of the carriage body, a storm curtain 69 is preferably mounted to protect the interior of the carriage from the weather, this curtain being wound up when not in use, upon a roll 67.

The operation of my device, it is thought, will be fully understood from the above description when read in connection with the drawings and the following explanation. When it is desired to use the electric motor 36 which is mounted upon the running gear of the baby carriage to rock the body of the carriage about its pivotal mountings, the carriage is moved to a position near a convenient electric light socket and the motor 36 is connected to the same by means of the wires 36''. The lever 49 which operates the sliding bolts 47 is then moved from the locking position, in which the parts are shown in Fig. 3 to their unlocked position by simply grasping the handle 51 and moving the same slightly to the left. The frame 19 and the carriage body mounted upon the same may then be rocked like a cradle about the pivotal mounting 18 by the motor 36 through the reducing gears and connecting rod 44. When it is desired to use the carriage to take the child for a ride instead of to rock the child, the electrical wires 36'' are disengaged from the motor 36 and the locking bolts 47 are moved to the position shown in Fig. 3 to prevent the frame 19 from rocking. The carriage may then be used to wheel the child in the usual manner.

Should it be desired to swing the carriage body 25 in a horizontal plane upon its running gear, all that is necessary is to press on the outer end of the flexible strip 32 to withdraw the pin 33 from engagement with a drill hole in the ring member 29, and the body 25 may then be swung about its pivot 31 to the desired angular position.

The fact that the motor is permanently mounted upon the carriage frame and is carried upon the same when it is not being used, does not materially increase the weight of the carriage, for since very little power is required to rock the carriage body, due to the number of reducing gears that are used, a very small electric motor will be sufficient to furnish the necessary power.

It will be apparent that numerous modifications of the construction herein disclosed may be adopted without departing from the scope of my invention as defined in the annexed claims.

What I claim is:

1. In a baby carriage, a supporting frame mounted upon wheels, a second frame pivotally mounted upon said supporting frame, spaced bolts mounted upon one of said frames adjacent the opposite ends thereof, and means for simultaneously moving said bolts into and out of engagement with the other frame for preventing one frame from moving relatively to the other about its pivotal mounting.

2. In a baby carriage, a supporting frame mounted upon wheels provided with a front and rear axle, a second frame pivotally mounted upon said axles, bolts slidably mounted upon said second frame, and means for simultaneously moving said bolts into engagement with said front and rear axles, whereby one frame is locked against movement relatively to the other frame.

3. In a baby carriage, a supporting frame provided with front and rear axles, a second frame pivotally mounted upon said axles, sliding bolts mounted upon opposite sides of said second frame, a lever pivotally mounted upon said second frame, said bolts being connected to said lever, whereby movement of said lever simultaneously moves said bolts into engagement with said axles to lock said second frame against movement relatively to said supporting frame.

4. In a baby carriage, a supporting frame mounted upon wheels, a second frame pivotally mounted upon said supporting frame, a carriage body mounted upon said second frame, and means for pivotally mounting said carriage body upon said second frame, whereby said body may be swung in a horizontal plane relatively to said second frame.

5. In a baby carriage, in combination, a wheeled supporting frame, a carriage body, and a swivel wheel for mounting said body upon said frame, said swivel wheel comprising a pair of members having contacting faces pivotally secured together, one of said members having a hole formed therein and the other member having a plurality of spaced holes formed therein, and a pin slidably mounted in the hole in the first mentioned member and movable into engagement with any one of the holes in the other member for locking said members against relative movement.

6. In a baby carriage, a supporting frame, a second frame pivotally mounted upon said supporting frame, a carriage body, and means for rotatably supporting said carriage body relatively to said second frame, whereby said body may be swung in a substantially horizontal plane relatively to said second frame.

7. In a baby carriage, a supporting frame mounted upon wheels, a second frame pivotally mounted upon said supporting frame to swing in a vertical plane, power operated means for rocking said second frame about its pivotal mounting, a carriage body supported by said second frame and mounted to be swung relatively thereto in a substantially horizontal plane, whereby rocking of said second frame rocks said body about either its longitudinal or transverse axis.

8. In a baby carriage having front and rear axles, a body supporting frame pivotally mounted on said axles, and means for locking said frame to said axles to prevent movement therebetween, comprising oppositely extending bolts slidably mounted on said frame, bolt-receiving means mounted on said axles, and means for simultaneously moving said bolts in opposite directions, whereby the bolts are simultaneously moved into or out of engagement with said bolt-receiving means.

9. In a baby carriage having front and rear axles, a body supporting frame pivotally mounted upon said axles, said frame having its intermediate portion displaced downwardly relatively to the ends of the same, transversely extending springs mounted upon said intermediate portion of said frame, a carriage body mounted upon said springs, and power-operated means for rocking said frame upon said axles.

In witness whereof, I have hereunto set my hand on the 17th day of April, 1918.

AUGUST L. LUCAS.

Copies of this patent may be obtained for five cents each, by addressing the "Commissioner of Patents, Washington, D. C."